United States Patent [19]

Stephany et al.

[11] 4,080,058

[45] Mar. 21, 1978

[54] APPARATUS FOR AUTOMATIC CONTROL OF AN INTERMEDIATE IMAGE STORAGE DEVICE IN AN ELECTROSTATOGRAPHIC PROCESSING MACHINE

[75] Inventors: Joseph F. Stephany, Sodus; James C. Traino, Fairport, both of N.Y.

[73] Assignee: Xerox Corporation, Stamford, Conn.

[21] Appl. No.: 591,799

[22] Filed: Jun. 30, 1975

[51] Int. Cl.² ........................................... G03G 15/00
[52] U.S. Cl. .................................... 355/14; 355/3 R; 355/5; 355/20
[58] Field of Search .................... 355/1, 3 R, 5, 14, 20

[56] References Cited

U.S. PATENT DOCUMENTS

| 2,736,770 | 2/1956 | McNaney | 355/14 X |
| 3,155,022 | 11/1964 | Schwertz | 355/5 |
| 3,761,171 | 9/1973 | Fields | 355/3 R |
| 3,761,172 | 9/1973 | Letzer | 355/3 R |
| 3,872,462 | 3/1975 | Lemelson | 355/3 R X |
| 3,911,419 | 10/1975 | Bates et al. | 355/5 X |
| 3,936,178 | 2/1976 | Kuehnle | 355/5 |

Primary Examiner—Fred L. Braun

[57] ABSTRACT

Apparatus for automatic control of an image storage device. The image storage device, of the type employing a liquid crystal, is utilized in an intermediate processing step during electrostatographic reproduction of the image. An automatic sequence of voltages and illuminations are applied to the image storage device for erasing previously stored images and for preparing the device for storage of an image. The stored image can be applied to a photoreceptor element of an electrostatographic machine for reproduction of the image. The liquid crystal image storage device can be utilized in conjunction with apparatus for displaying signal encoded data. The display of the signal encoded data can be in a format inconvenient for direct application to the photoreceptor, the image storage device serving as a buffer memory for the image. The stored image can be utilized in conjunction with the electrostatographic machine to provide single or multiple copies of the image.

8 Claims, 7 Drawing Figures

APPARATUS FOR AUTOMATIC CONTROL OF AN INTERMEDIATE IMAGE STORAGE DEVICE IN AN ELECTROSTATOGRAPHIC PROCESSING MACHINE

This invention relates generally to apparatus for electrostatographic reproduction of images and more particularly to apparatus providing an image storage device during an intermediate reproduction processing step. The intermediate storage device can act as a buffer device, transforming an image having a format unacceptable for efficient electrostatographic reproduction into an image having an acceptable format. A plurality of image storage devices can provide precollation of a plurality of images into a predetermined sequence.

It is frequently convenient to reduce an image to a signal encoded format, such as in a suitable binary signal encoding in order for the storage or the transmission of the image. The encoding of the image can be in a line-by-line or raster scanning format or in a format providing a more compact or convenient signal representation. In order to reconstruct the signal encoded image, the encoded signals are used to activate a display device and the resulting display can be focused on an appropriate photosensitive surface for subsequent development. For example, in the FR-80 Computer Printer System, available from Information International Inc., having offices in Los Angles, Calif., an image in the form of binary encoded signals, activate a cathode ray tube display device. The image of the cathode ray tube face is focused on a film medium. The film is subsequently developed providing a copy of the displayed image. A particularly important feature of this system is the use of the film medium to accumulate displayed portions of the image, the composite of the displayed portions providing the entire image. This feature permits the signal encoded data to activate the display device without a restructuring of the data in a line-by-line scan synchronized with exposure of the storage medium and/or without additional apparatus providing a storage of the image for continual display on the cathode ray tube. In the absence of the image storage medium, multiple image reproductions can be obtained by repeated display of the image on the oscilloscope or by separate multiple reproduction of the developed film.

It can be desirable to replace the film medium with a plain paper medium and utilize the convenient techniques of electrostatographic reproduction. However, it is desirable that the apparatus accomplishing this change not require the photoreceptor to be immobilized during the focusing of the image to be reproduced. In addition, the use of apparatus for image reformatting or for image signal storage is undesirable. Furthermore, the interaction between the apparatus providing the image encoded signals should be automatic and the opportunity for multiple reproduction should be provided.

It is therefore an object of the present invention to provide an improved electrostatographic image reproduction machine.

It is a further object of the present invention to provide an improved electrostatographic image reproduction machine for reproducing images formed on a display medium.

It is yet another object of the present invention to provide apparatus for electrostatographic reproduction of a signal encoded image.

It is still another object of the present invention to provide a device for storage of an applied image prior to electrostatographic reproduction of the applied image.

It is a still further object of the present invention to provide an image buffer device for temporarily storing an applied image before electrostatographic reproduction of the applied image.

It is yet a further object of the present invention to provide a device for accumulating and storing image components produced by a signal activated display device prior to electrostatic reproduction of the image.

It is a more particular object of the present invention to provide apparatus for automatically operating an image storage device which stores a displayed image, the stored image thereafter being electrostatographically reproduced.

It is yet another particular object of the present invention to provide apparatus for automatically controlling the erasing image storage and image display of a image display device in synchronism with the operation of a display device and electrostatographic reproduction apparatus.

It is a still further object of the present invention to provide apparatus for automatic production of a plurality of electrostatographic reproductions of an image stored on an image storage device.

It is yet a further object of the present invention to provide for electrostatographic reproduction of a signal encoded image by means of an image storage device, which stores the image formed on a display apparatus by the encoded signals, and apparatus for electrostatographic reproducing the stored image.

It is a still further object of the present invention to provide apparatus for converting a displayed image into a format suitable for electrostatographic reproducing.

It is a further object of the present invention to provide apparatus capable of electrostatic reproduction of both documents and images encoded in a suitable format.

The aforementioned and other objects are accomplished according to the present invention, by providing an image storage device, which can accumulate component portions of an image as the portions are exhibited by a display device and which can apply the stored image to the photosensitive medium of an electrostatographic reproduction device. Control apparatus is provided for automatically synchronizing the image storage device with both the display device and the electrostatographic reproduction device.

The image storage apparatus can be a liquid crystal device. The control apparatus in response to signals from the display apparatus, erases images remaining on the liquid crystal devices and sensitizes the storage device to image provided by the display device. Upon storage of the complete image by the liquid crystal storage device, the stored image is focused on the photosensitive element of the electrostatographic reproduction machine. The image can remain focused for the reproduction of a plurality of image copies before preparation of the storage device for a succeeding image.

These and other features of the invention will be understood upon reading of the following description along with the drawing wherein:

FIG. 4c is a chart illustrating timing signals produced by the timer devices in the circuit of FIG. 4a.

Figure 1:
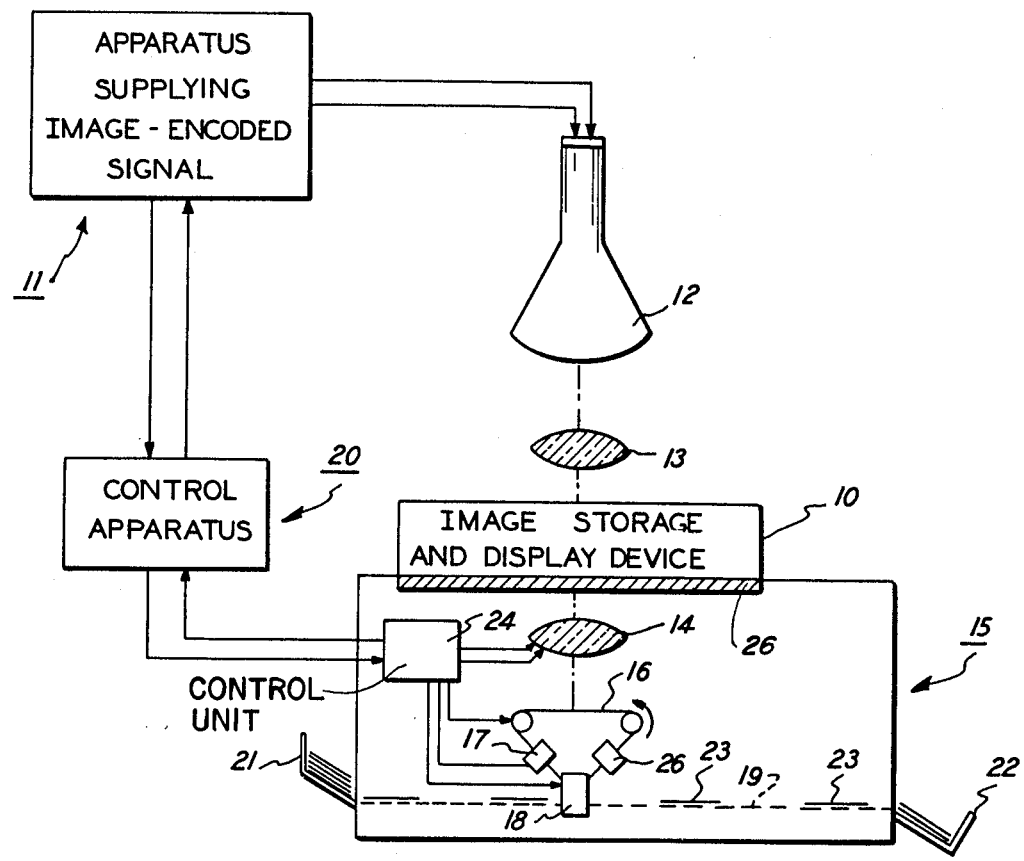
FIG. 1 is a block diagram of the apparatus for providing electrostatographic reproduction of signal encoded images according to the preferred embodiment.

Referring now to FIG. 1, the block diagram of the apparatus for providing electrostatographic reproduction of an image encoded in an electrical signal format is shown. Apparatus 11 provides the signals into which the image has been encoded. Signal apparatus 11 can, for example, be a data processing machine in which the image encoded signals are stored in a memory unit or apparatus for receiving transmitted image encoded signal. The image encoded signals of signal apparatus are applied to display device 12, in the preferred embodiment display device 12 is a cathode ray tube, and the applied signals activate the display device output image. The output image of display device 12 is focused by means of optical system 13 onto image storage and display device 10. Optical system 13 can be a lens system, or a fiber optics system for example. Optical system 13 can be eliminated if display device 12 is sufficiently close to image device 10.

The activation of the display device 12 by signal apparatus 11 is communicated to control apparatus 20. Control apparatus 20 having previously prepared image device 10 for receipt of an image i.e., by erasure of a previously stored image, now sensitizes the image device 10 to the image focused thereon.

After completion, the storage of the image by image device 10, communicated from signal apparatus 11 to control apparatus 20, control apparatus 20 signals the control unit 24 of an electrostatographic reproducing machine 15 to provide a reproduction of the image stored in image device 10. The control apparatus 20 actuates the display portion of device 10 thereby providing a display of the stored image. In the preferred embodiment, image device 10 is positioned near the document platen 26 of the machine 15. The displayed image is focused by means of optical system 14 onto a photoreceptor of machine 15. The optical system 14 can include optical elements as well as mechanical apparatus for moving the position of the image device 10. A drum-type or belt-type photoreceptor can be utilized to receive the displayed image. The portion of photoreceptor 16 receiving the display image is developed at developer station 17 and transferred and focused to copy sheets 23 at transfer station 18. Copy sheets 23 are supplied by paper source 21 transported along feed path 19 by appropriate means and deposited in finished copy sheet path 22. The apparatus for implementing the development, transfer and fusing of the electrostatic image produced by the displayed image on the photoreceptor are known to those skilled in the art of electrostatographic reproduction.

Figure 2:
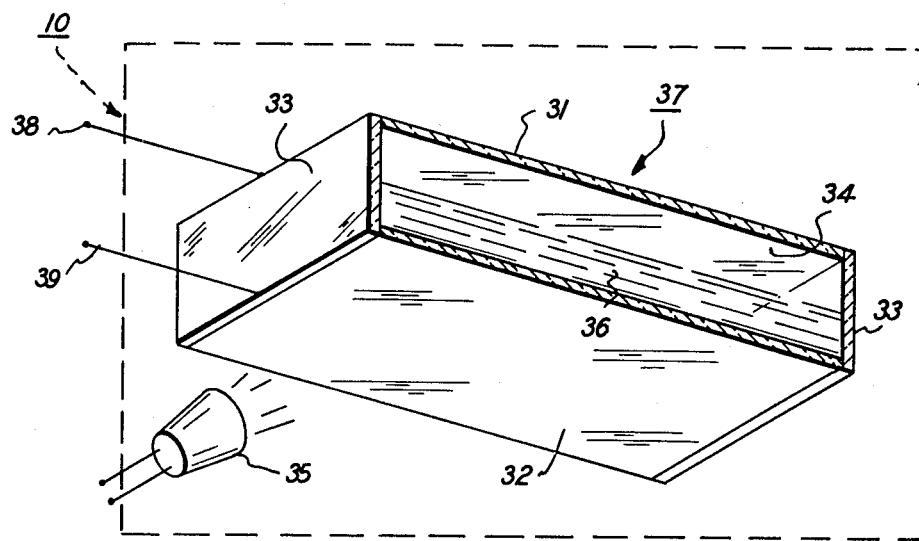
FIG. 2 is a schematic diagram of a liquid crystal image storage utilized in the preferred embodiment.

Referring next to FIG. 2, the image storage and display device 10 according to the preferred embodiment is shown. The image device 10 is comprised of transparent conducting window 31 and 32. When transparent insulating material has a thin conducting layer applied on only one surface of the window, the conducting surface in on the surface forming a cavity. Deposited on conducting window 31 is a photoconducting material 34. A liquid crystal material 36 is located between photoconducting material 34 and window 32. An insulating material 33 provides structural support for the windows 31 and 32 and provides an enclosure for the liquid crystal material 36. Windows 31 and 32 are coupled respectively to conducting leads 38 and 39. A source of illuminating 35 is also provided.

The operation of the image device 10 can be understood as follows. The liquid crystal, utilized in the preferred embodiment contains two components. One component produces a current induced scattering of applied radiation. The second component provides a material which impedes the current induced optical scattering mechanism from relaxing and disappearing. When a voltage is applied between windows 31 and 32, i.e. via electrical couplings 38 and 39, the insulating properties of photoconductor 34 in the absence of applied radiation, prevent current from flowing in the liquid crystal. However, when radiation is applied on a local region of the photoconductor, the insulating property is altered and the photoconductor becomes conducting in the region of applied radiation and voltage applied between windows 31 and 32 is now applied between photoconducting material 34 and window 32 across the liquid crystal 36, causing a current to flow and optical scattering to be produced. When the spacing between window 32 and photoconducting material is sufficiently small, the flow of current will be confined to a localized region. Upon removal of the voltage between conducting leads 38 and 39, the local optical scattering will remain. When the image device 10 is now illuminated with a generalized or flooding radiation, the optical scattering centers will scatter the applied radiation while in the region of insignificant optical scattering the flood illumination will be reflected. Thus, as will be clear to those skilled in the art by proper positioning of flood illumination and apertures stops, an image determined by the illumination in the presence of applied voltage can be produced. There the image device 10 provides the mechanism for storing an optical image along with the ability to display that image.

Figure 3:
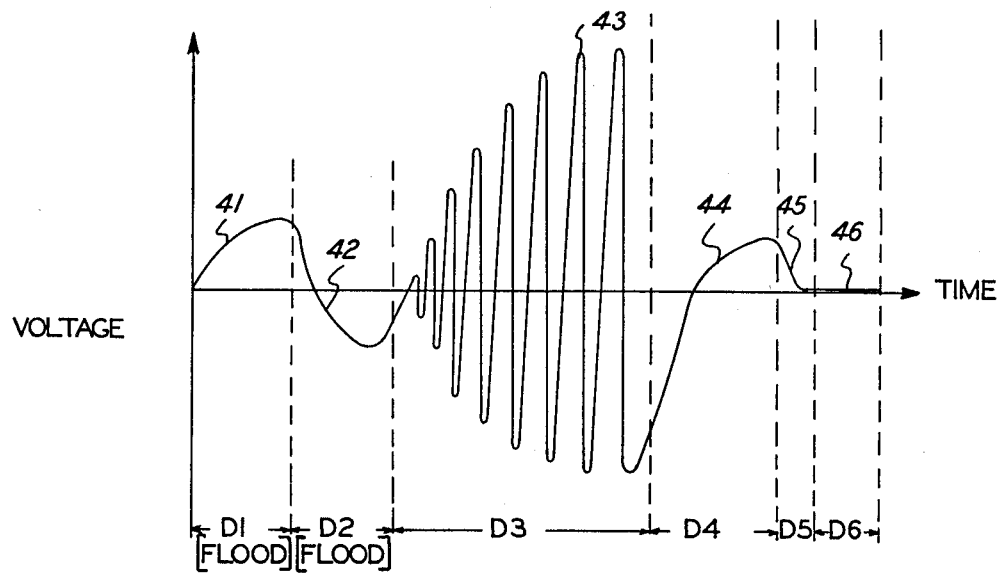
FIG. 3 is a voltage diagram indicating the voltage utilized in the operation of the liquid crystal image storage device.

Referring now to FIG. 3, the potential voltage applied to conducting leads 38 and 39 of the liquid crystal cell 37 during a typical operation cycle is shown. During a period D1, in the presence of flood illumination, a gradually increasing voltage 41 is applied. This period provided a uniform optical scattering of the entire liquid crystal cell 37 so that after erasure of the scattering, any residual scattering will be uniform over the entire cell. During period D2 a negative voltage 42 is gradually applied to the cell 39 in the presence of flood illumination. The use of reverse current can, for some liquid crystal materials prolong the useful lifetime. However, some materials do not require the application of a negative voltage and for the material a pause with no applied voltage can be utilized during D2. During D3, an oscillating voltage of gradually increasing magnitude in a preselected frequency range is applied to conducting leads 38 and 39. The result of this oscillating voltage application is the removal of a majority of the optical scattering centers in the liquid crystals. During period D4, a gradually increasing voltage 45 is applied between conducting leads 38 and 39, in the absence of flood illumination. During this time interval, the cell 37 is exposed to and stores the optical image to be reproduced. The time period D5 provides a wait period including the absence of applied voltage 45 and flood illumination. During period D6, a substantially null voltage 46 is applied to conducting leads 38 and 39. During this period, the flood illumination or other illumination source can provide a display of stored image. As will be seen from FIG. 3, care should be taken to prevent abrupt changes in the voltage applied to the liquid crystal material to prevent undersirable effects from occurring.

Figure 4C:
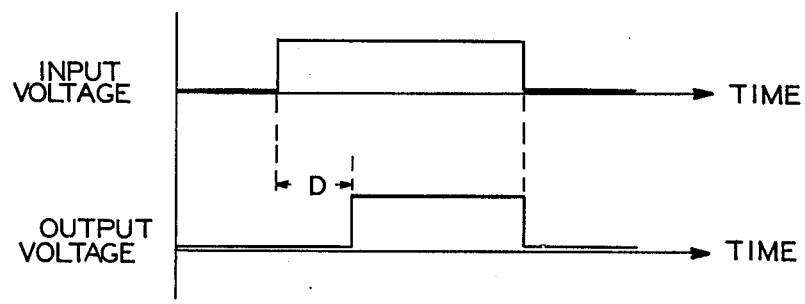
Figure 4A:
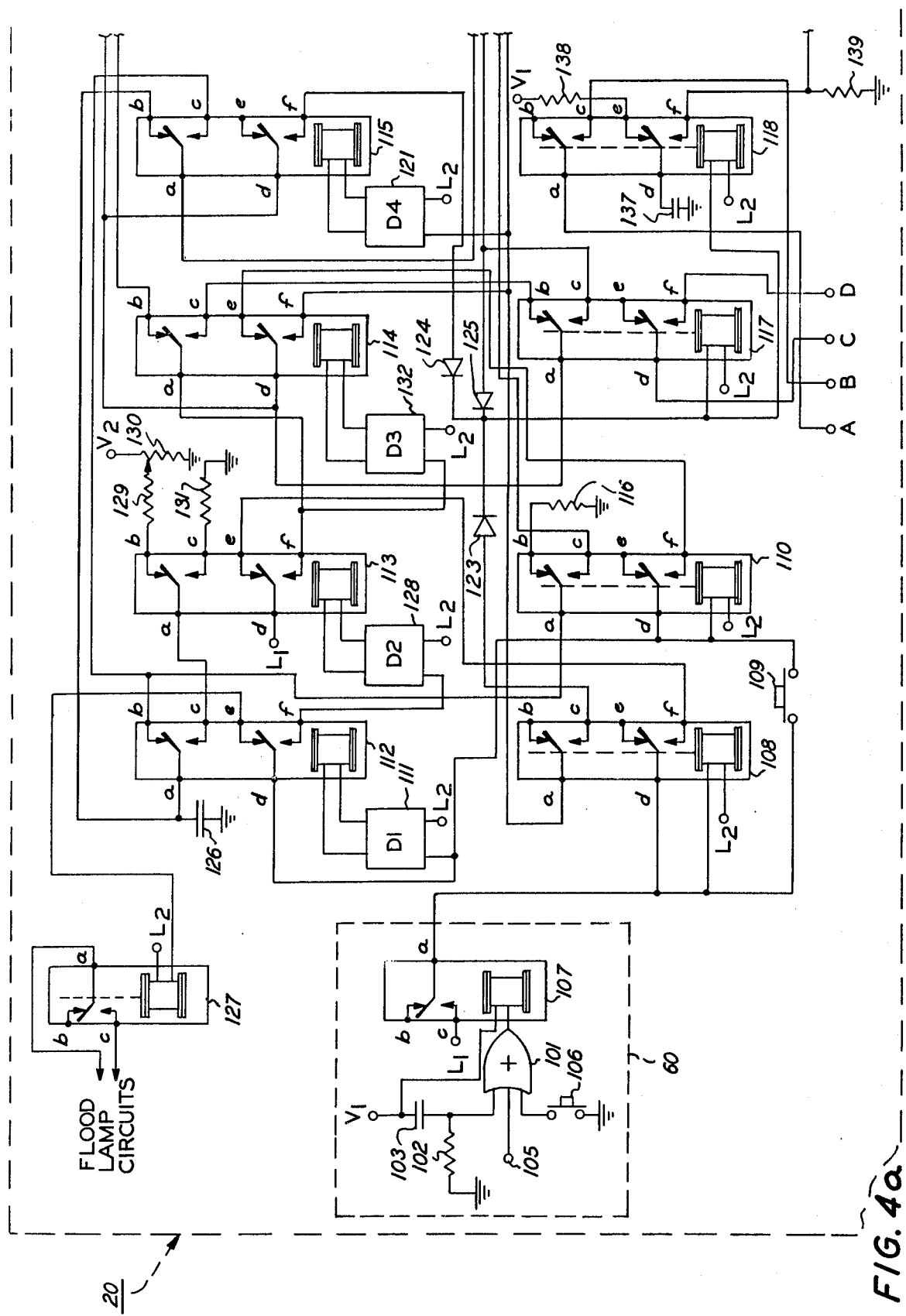
FIG. 4a is a schematic diagram of the control apparatus providing automatic control of the liquid crystal image storage device according to the preferred embodiment.
Figure 4B:
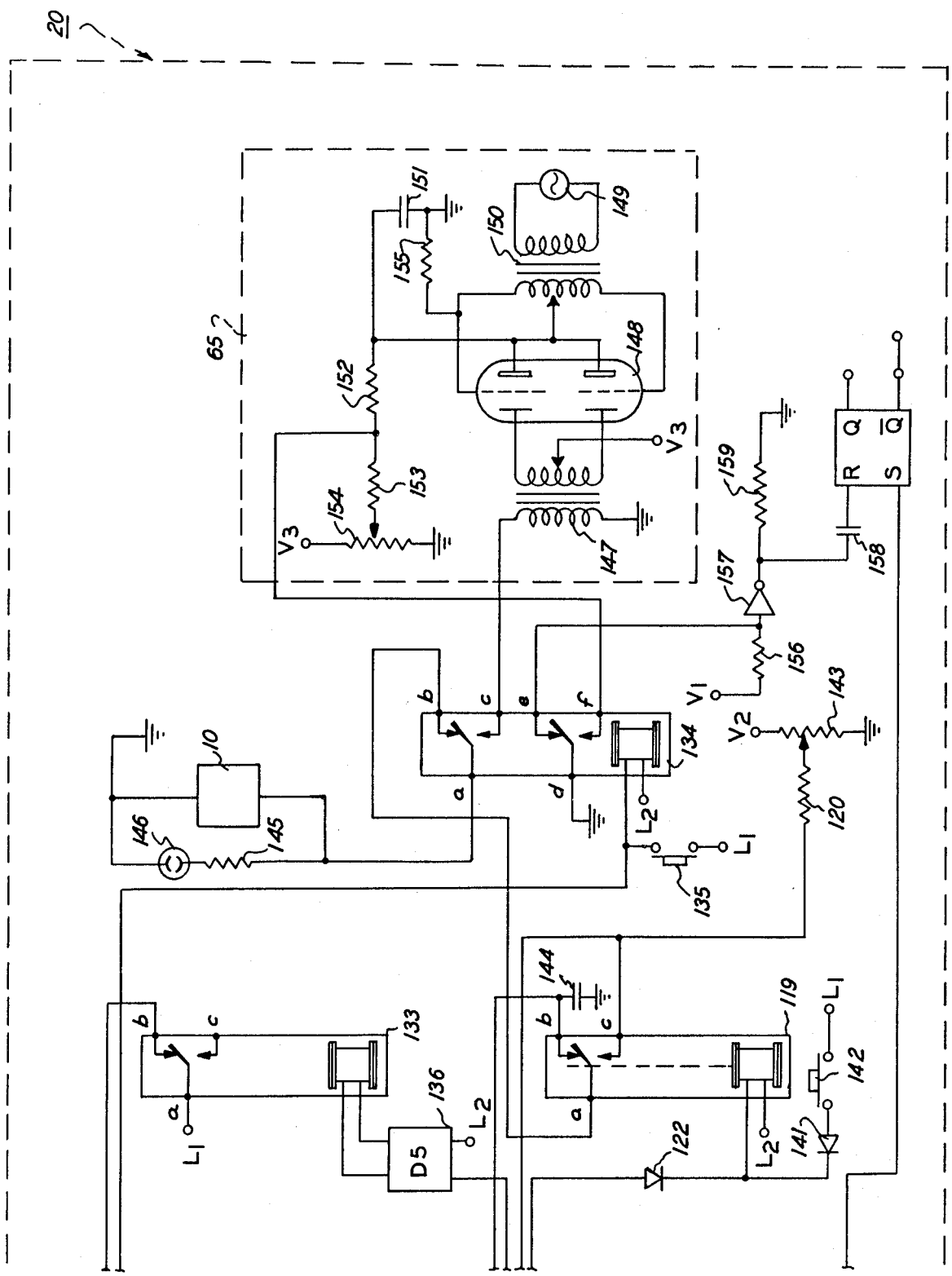
FIG. 4b is a voltage diagram indicating the operation of the timing devices utilized in the automatic control apparatus.

Referring next to FIG. 4a, the control apparatus 20 for control of the image device 10 and for providing an interface between signal apparatus 11 and the electrostatographic reproducing machine 15 is shown. In FIG. 4a, a plurality of timer devices labelled D1 (111), D2 (128), D3 (132), D4 (121) and D5 (136) are shown. These devices have the general characteristic shown in FIG. 4c. An input voltage applied to the timer device results in an output voltage which is delayed by a predetermined time interval D from the application of the input voltage. However, removal of the input voltage to timer devices results in a substantially or only slightly delayed removal of the output voltage.

Initiation apparatus 60 provides a method of initiating an operational cycle for the image device 10. One input terminal of logic "OR" gate 101 is coupled to terminal 105, a second input terminal of "OR" gate 101 is coupled through manual switch 106 to a common potential and a third input terminal of "OR" gate 101 is coupled through resistor 102 to the common potential and through capacitor 103 to voltage source $V_1$. Voltage source $V_1$ is also coupled to a first solenoid terminal of relay 107. A second solenoid terminal is coupled to an output terminal of "OR" gate 101. A fixed terminal c of relay 107 is coupled to power source $L_1$, and fixed terminal b of relay 107 is not electrically coupled. In the description of the relays, terminal a can be controllably coupled to either terminal b or to terminal c while terminal d can be controllably coupled to either terminal e or to terminal f, the particular coupling of the controllable terminal determined by the activation of the relay solenoid.

Controllable terminal a of relay 107 is coupled to controllable terminal d of relay 108, a first solenoid terminal of relay 108 and to a first terminal of switch 109. A second solenoid terminal of relay 108 is coupled to power source $L_2$.

A second terminal of switch 109, is coupled to a first solenoid terminal of relay 110, to a controllable terminal d of relay 110, to a first input terminal of timer 111, and to controllable terminal d of relay 112. Fixed terminal b of relay 108 and fixed terminal e of relay 108 are not electrically coupled. Fixed terminal f of relay 108 is coupled to fixed terminal e of relay 113. Fixed terminal c of relay 108 is coupled to an anode of diode 123. Controllable terminal a of relay 108 is coupled to fixed terminal f of relay 114, to a first terminal of timer 121 and to an anode of diode 122.

A second solenoid terminal of relay 110 is coupled to power source $L_2$. Fixed terminal e of relay 110 is not electrically coupled, while fixed terminal b of relay 110 is coupled through resistor 116 to a common potential. Fixed terminal f of relay 110 is coupled to fixed terminal e of relay 114. Fixed terminal c of relay 110 is coupled to a fixed terminal c of relay 119 and to one terminal of resistor 120. Controllable terminal a of relay 110 is coupled to fixed terminal b of relay 112 and to fixed terminal c of relay 115.

A second input terminal of timer 111 has power source $L_2$ applied thereto, while the output terminals of timer 111 are applied to the solenoid terminals of relay 112. Controllable terminal a of relay 112 is coupled through capacitor 161 to the common potential and to fixed terminal b of relay 115. Fixed terminal c of relay 112 is coupled to controllable terminal a of relay 113. Fixed terminal e of relay 112 is coupled to a first solenoid terminal of relay 127, while a second solenoid terminal of relay 127 is coupled to power source $L_2$. Fixed terminal b of relay 127 is not electrically coupled, while fixed terminal c and controllable terminal a of relay 127 are coupled to flood lamp circuits. Fixed terminal f of relay 112 is coupled to a first input terminal of timer 128.

A second input terminal of timer 128 is coupled to power source $L_2$ while the output terminals of timer 128 are coupled to input terminals of a solenoid of relay 113. Controllable terminal d of relay 113 is coupled to power source $L_1$. Fixed terminal b of relay 113 is coupled through resistor 129 to a controllable terminal of resistance dividing network 130. Fixed terminals of resistance dividing network 130 are coupled between potential source $-V_2$ and the common potential. Fixed terminal c of relay 113 is coupled through resistor 131 to the common potential. Fixed terminal f is coupled to a first input terminal of timer 132 and to a controllable terminal a of relay 114.

A second input terminal of timer 132 is coupled to power source $L_2$, while output terminals of timer 132 are coupled to terminals of a solenoid of relay 114. Controllable terminal d of relay 114 is coupled to controllable terminal d of relay 115, to fixed terminal b of relay 133 and to controllable terminal a of relay 117. Fixed terminal b of relay 114 is coupled through switch 135 to power source $L_1$, and to a first terminal of a solenoid of relay 134. Fixed terminal c of relay 114 is coupled to fixed terminal b of relay 117.

A second input terminal of timer 121 is coupled to power source $L_2$, while output terminals of timer 121 are coupled to terminals of a solenoid of relay 115. Fixed terminal a of relay 115 is coupled to fixed terminal b of relay 119 and through capacitor 144 to the common potential. Fixed terminal e of relay 115 is not electrically coupled while fixed terminal f of relay 115 is coupled to a anode terminal of diode 124. A cathode terminal of diode 124 is coupled to a cathode terminal of diode 125.

Controllable terminal a of relay 133 is coupled to power source $L_1$, while fixed terminal c of relay 133 is not coupled. Solenoid terminals of relay 133 are coupled to output terminals of timer 136. A first input terminal of timer 136 is coupled to power source $L_2$, while a second input terminal of timer 136 is coupled to an anode terminal of diode 125 and to a fixed terminal c of relay 117.

Fixed terminal e of relay 117 is not coupled electrically while fixed terminal f of relay 117 is coupled to terminal D. Controllable terminal d of relay 117 is coupled to terminal C. A first terminal of a solenoid of relay 117 is coupled to power source $L_2$ while a second terminal of the solenoid of relay 117 is coupled to a first terminal of a solenoid of relay 118 and to a cathode terminal of diode 125.

A second terminal of the solenoid of relay 118 is coupled to power source $L_2$. Controllable terminal d of relay 118 is coupled through capacitor 137 to the ground potential. Fixed terminal e of relay 118 is coupled through resister 138 to potential source $V_1$. Fixed terminal f of relay 118 is coupled through resister 139 to the common potential and to a set terminal S of an R - S bistable network 140. Controllable terminal a of relay 118 is coupled to terminal A while fixed terminal c relay 118 is coupled to terminal B. Fixed terminal b of relay 118 is not electrically coupled.

Controllable terminal a of relay 119 is coupled to fixed terminal b of relay 134. A cathode terminal of diode 122 is coupled to a first terminal of a solenoid of relay 119 and to a cathode terminal of diode 141. A second solenoid terminal of relay 119 is coupled to power source $L_2$. An anode terminal of diode 141 is coupled through switch 142 to power source $L_1$. A second terminal of resistor 120 is coupled to a controllable terminal of resistance dividing network 143 while fixed terminals of resistance dividing network 143 are coupled potential source $V_2$ and to the ground potential respectively.

A second solenoid terminal of relay 134 is coupled to power source $L_2$. Controllable terminal a of relay 134 is coupled through image device 10 to the common potential and through resistor 145 and lamp 146 coupled in series to the ground potential fixed terminal c of relay 134 is coupled through the output winding of transformer 147 to the common potential. Controllable terminal d of relay 134 is coupled to the common potential. Fixed terminal e of relay 134 is coupled through resistor 156 to potential source $V_4$ and to an input terminal of inverting amplifier 157. An output terminal of inverting amplifier 157 is coupled through resistor 159 to a common potential and through capacitor 158 to terminal R of R - S bistable network 140. Fixed terminal f of relay 13 is coupled to a first terminal of resistor 153 and to a first terminal of resistor 152. A second terminal of resistor 153 is coupled to a controllable terminal of a resistance dividing network 154 while fixed terminals of the resistance dividing network are coupled to the common potential and to voltage source $V_3$. A second terminal of resistor 152 is coupled through capacitor 151 to the common potential, to the cathode terminals of twin triode 148, and to a center-top terminal of an output windings of transformer 150. Terminals of the output winding of transformer are coupled to the grid electrodes of twin diode 148. A first grid electrode is coupled through resistor 155 to the common potential. Input winding terminals of transformer 150 are coupled to oscillator 149. Input winding of transformer 147 are coupled to plate electrodes of twin diode 148 while a tapped terminal of the input winding of transformer 147 is coupled to potential source $V_3$.

The operation of the control apparatus 20 can be described as follows. Pulse generating apparatus 60 causes activation of the solenoid associated with relay 107 when one of input terminals of "OR" 101 assumes a potential sufficiently close to a common potential. The pulse can be generated manually by switch 106, by a signal applied to terminal 105 from, for example, the signal apparatus 11, or upon turning on the apparatus wherein capacitor 103 is gradually charged through resistor 102. The activation of the solenoid of relay 107 causes the power source $L_1$ to be applied through relay 107 to a solenoid terminal of relay 108. When power sources $L_1$ and $L_2$ are simultaneously applied to the solenoid terminals, the positions of the controllable terminals are changed. Thus power source $L_1$ is applied to the solenoid terminal of 108 through (unactivated) relay 113 and relay 108, even upon inactivation of the solenoid of relay 107.

Upon closing of switch 109, the solenoid of relay 110 is activated and a voltage input is now applied to timer 111. However, for a period of time D1, the solenoid of relay 112 remains inactivated. During time D1, the potential applied to the controllable terminal of resistance dividing network 143 is applied through relay 110, through relay 112, through relay 115, through relay 119, through relay 134 and applied to image device 10. Therefore, with the assistance of capacitors, 151 and 144, curve 41 of FIG. 3 is produced. During the period of time D1, power source $L_1$ is applied to the solenoid of relay 127 activating the flood lamp circuits.

After time D1, the solenoid of relay 112 is activated, and power source $L_1$ applied to timer 128, and the potential of the controllable terminal of resistance dividing network 130 is applied through (as yet unactivated) relay 113 through relay 112, through relay 115, through relay 119, through relay 134 and applied to the image device 10, the capacitors 151 and 144, eliminating an abrupt voltage change. Thus the voltage of segment 42 of FIG. 3 is applied to the image storage and display device. In the preferred embodiment, the flood lamp remains activated by a timing circuit (not shown) associated with the flood lamp circuit.

After a period D2, the solenoid of relay 113 is activated. Power source $L_1$ is removed from the solenoid of relay 108, thereby inactivating relay 108. Power source $L_1$ is applied to timer 132 and the solenoid of relay 134. Oscillator circuit 65 includes an oscillator 149 driving a twin triode electron tube. The output of the electron tube is used to apply the oscillation voltage to image device 10 through relay 134. Relay 134 changes the cathode potential of the triodes of electron tube 148 rendering the tube nonconductive. However, as capacitor 151 discharges the electron tube will become increasing conductive producing curve 43 of FIG. 3. The relay 134 also removes the short circuit from input terminal of amplifier 157. However the differentiating circuit formed by resistor 159 and capacitor 158 prohibit activation of bistable network 140, the bistable network activated on by a positive going pulse.

After time D3, timer 132 activates the solenoid relay 114, thereby inactivating relay 110. The inactivation of relay 110 causes timer 111 and timer 128 to inactivate relay 112 and relay 113 respectively. The inactivation of relay 113 remove the power source from timer 132, however, timer 132 continues to be coupled to power source $L_1$ via relay 114, relay 117 and relay 133. Relay 134 is also inactivated and the input of amplifier 157 is grounded to cause the R - S bistable network 140 to be reset. The Q terminal of network 140 produces a signal indicating that the image device 10 is ready to store an optical image. The activation of relay 114 applies power source $L_1$ to timer D4 via relay 133 and the solenoid of relay 119 is activated causing voltage from network 143 to be applied to the image device 10 via relay 119 and relay 134.

Upon completion of an image display, the signal apparatus sends an "advance" signal to terminal 105 of control apparatus 20. Relay 108 is activated as before and power source $L_1$ applied through relay 113 maintains the activation of relay 108. Relay 108 activates the solenoids of relay 117 and relays 118. Activation of relay 117 and 118 causes a shorting of terminals C and D and of A and B which in turn causes the activation of the electrostatographic reproduction machine 15. Activation of relay 118 also removes the signal from the S terminal of bistable network 140. In the absence of a signal applied to terminal 105, the passage of time interval D4 will produce the same activation of relay 117 and relay 108 as produced by relay 108.

After interval D4, timer 136 has a potential applied thereto. Timer 136 provide a pause and after an interval D5, relay 117 and relay 118 are inactivated and by removal of power from timer 32, timer 121 and timer B6, relay 114, relay 115 and relay 133 are all respectively inactivated. The next sequence of control apparatus 20 will begin upon activation of switch 109.

Figure 5:
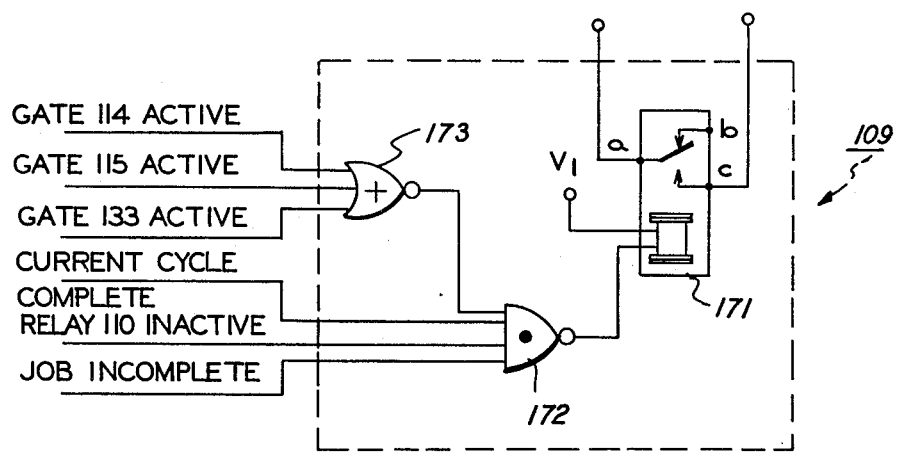
FIG. 5 is a schematic block diagram providing for a variable time period for multiple image reproduction.

Referring now to FIG. 5, the preferred embodiment of switch 109 is shown. When multiple copies of the signal encoded image are desired, a variable time D5 will be necessary to expose the photoreceptor 16 from the image device 10. Switch 109 is comprised of a relay 171, a logic "NAND" gate 172 and a logic "NOR" gate 173. The controllable terminal a and the fixed terminal c are the terminals of switch 109 in the control apparatus 20. A solenoid of relay 171 has a first terminal coupled to potential $V_1$ and second terminal coupled to an output terminal of "NAND" gate 172. A first input terminal of the "NAND" gate 172 is coupled to a terminal of the electrostatic reproduction machine indicating with a positive logic signal that the exposure of the image device 10 has been completed. A second input terminal is coupled to signal apparatus 11 indicating with a positive signal that the sequence of reproductions of signal encoded images is not complete. A third input terminal of "NAND" gate is coupled to an output terminal of "NOR" gate 173. The input terminals of "NOR" gate 173 are coupled to apparatus which senses the output signal of timer 132, 121 and 136 respectively. When the output signals of all the timers are null signals, a positive signal will be present at the third input terminal of "NAND" gate 172. A fourth terminal couple to apparatus associated with relay 110 and when relay 110 inactive, a positive signal is applied to the fourth terminal of "NAND" gate 172. When all the input signals of "NAND" gate 172 are positive signals, the output terminal of NAND gate will be a null signal and the solenoid and therefore the relay of 171 will be activated.

The control apparatus 20 therefore provides for automatic interface between the apparatus producing the signal encoded images, the image apparatus and the electrostatographic reproduction apparatus. The signal apparatus 11, in the preferred embodiment produces a signal when an image is ready to be displayed on display device 12, but produces the display only upon proper receipt of the signal. The electrostatographic reproducing apparatus begins the appropriate sequencing upon receipt of the signals from the control apparatus of storage of an image in display device 10. The cycle is repeated upon determination that the electrostatographic reproduction machine has completed the operation, for example, an appropriate number of copies has been produced.

The above description is included to illustrate the operation of the preferred embodiment and is not meant to limit the scope of the invention. The scope of the invention is limited only by the following claims. From the above discussion, many variations will be apparent to one skilled in the art that would yet be encompassed by the spirit and scope of the invention.

What is claimed is:

1. A system for electrostatographic reproduction of an image related to image encoded signals, comprising:
    means responsive to a ready signal for producing an image determined by said image encoded signals;
    storage and display means for storing and for displaying the image produced by said image producing means;
    means for electrostatographically reproducing the image displayed by said storage and display means; and
    control means for said system, said control means including first means for preparing said storage and display means for receipt of an image in response to a start signal, said control means including second means for providing said ready signal for activating said image producing means when preparation of said storage and display means is completed.

2. The electrostatographic reproducing system of claim 1 wherein said storage and display means is comprised of a liquid crystal and photoconductor combination.

3. The electrostatographic reproducing system of claim 2 including a power source for providing an operating voltage to said storage and display means, and lamp means for illuminating said storage and display means, said control means including third means for regulating voltage and illumination applied to said storage and display means by said power source and said lamp means to erase a previously stored image.

4. The electrostatographic reproducing system of claim 2 wherein said control means includes means for producing a signal to said electrostatographic reproducing means when storage of the image by said storage and display means is completed.

5. An improved system for the reproduction of images related to image encoded signals of the type having apparatus for producing an image determined by said image encoded signal, apparatus for storage and display of said image produced, and electrostatographic apparatus for reproduction of the stored image, wherein the improvement comprises
    control means for automatically controlling operation of said storage and display apparatus, said control means activating said storage and display apparatus in response to a signal from said image producing apparatus to ready said storage and display apparatus for receipt of an image, said control means activating said image producing apparatus when said storage and display apparatus is ready, said control means activating said electrostatographic apparatus when storage of the image produced by said image producing apparatus in said storage and display apparatus is completed.

6. The improved electrostatographic reproduction system of claim 5 wherein said storage and display apparatus is comprised of a cell including a liquid crystal and photoconductor combination.

7. An electrostatographic reproduction system comprising:
    image supply means for supplying signals encoded with image information;
    means for displaying an image determined by said image supply means signals;
    means for storing the image displayed by said display means, said storage means further including means for displaying the stored image;
    electrostatographic means for reproducing the image stored in said storage means; and control means for automatically controlling operation of said system, said control means being responsive to a signal from said image supply means for activating said storage means to receive the image displayed by said image displaying means, said control means activating said display means for the stored image when the image is completed in said storage means, said control means initiating operation of said electrostatographic reproduction means upon display of the image by said stored image display means whereby to produce a permanent copy of said image.

8. The electrostatographic reproduction system of claim 7 wherein said storage means is comprised of a liquid crystal photoconductor combination.

* * * * *